United States Patent
Zhou

(10) Patent No.: US 11,094,267 B2
(45) Date of Patent: Aug. 17, 2021

(54) PROXIMITY DETECTION METHOD, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/723,533

(22) Filed: Dec. 20, 2019

(65) Prior Publication Data

US 2020/0126495 A1     Apr. 23, 2020

Related U.S. Application Data

(63) Continuation of application No. PCT/CN2018/094448, filed on Jul. 4, 2018.

(30) Foreign Application Priority Data

Jul. 31, 2017 (CN) .......................... 201710644147.8

(51) Int. Cl.
    *G06F 3/042* (2006.01)
    *G09G 3/34* (2006.01)
    (Continued)

(52) U.S. Cl.
    CPC ......... *G09G 3/3406* (2013.01); *G06F 1/3218* (2013.01); *G06F 1/3231* (2013.01);
    (Continued)

(58) Field of Classification Search
    CPC ........... G09G 3/3406; G09G 2330/023; G09G 2360/144; G06F 3/0416; G06F 3/041; G06F 3/0484; G06F 3/042; G06F 2203/04101
    See application file for complete search history.

(56) References Cited

U.S. PATENT DOCUMENTS 9,063,010 B2 * 6/2015 Wu .......................... G01S 7/493
10,452,937 B2 * 10/2019 Jin .......................... G06F 3/0416
(Continued)

FOREIGN PATENT DOCUMENTS

| CN | 106131345 A | 11/2016 |
| CN | 106303021 A | 1/2017 |

(Continued)

OTHER PUBLICATIONS

International search report issued in corresponding international application No. PCT/CN2018/094448, dated Sep. 28, 2018 (2 pages).

(Continued)

*Primary Examiner* — Vijay Shankar
(74) *Attorney, Agent, or Firm* — Young Basile Hanlon & MacFarlane, P.C.

(57) ABSTRACT

A proximity detection method may include acquiring an ambient light intensity value; detecting whether a terminal is in a bright light environment according to the ambient light intensity value; in response to the terminal being in the bright light environment, reading at least one group of proximity values output by a proximity sensor; and calculate a target proximity value according to the at least one group of proximity values, and performing proximity detection according to the target proximity value. Each group of proximity values comprises proximity values output by the proximity sensor in response to a transmitting end of the proximity sensor being sequentially controlled not to trans- (Continued)

mit a detection signal, to transmit the detection signal, to transmit the detection signal, to transmit the detection signal, and not to transmit the detection signal.

20 Claims, 5 Drawing Sheets

(51) Int. Cl.
<table>
<tr><td>G06F 1/3218</td><td>(2019.01)</td></tr>
<tr><td>G06F 1/3231</td><td>(2019.01)</td></tr>
<tr><td>G06F 1/3234</td><td>(2019.01)</td></tr>
<tr><td>G06F 3/041</td><td>(2006.01)</td></tr>
<tr><td>H04W 52/02</td><td>(2009.01)</td></tr>
</table>

(52) U.S. Cl.
CPC ............ *G06F 1/3265* (2013.01); *G06F 3/042* (2013.01); *G06F 3/0416* (2013.01); *H04W 52/0254* (2013.01); *G06F 2203/04101* (2013.01); *G09G 2330/023* (2013.01); *G09G 2360/144* (2013.01)

(56) References Cited

U.S. PATENT DOCUMENTS

| | | | | |
|---|---|---|---|---|
| 10,593,294 | B2 * | 3/2020 | Bonnier | ................... G09G 3/20 |
| 10,802,596 | B2 * | 10/2020 | Cao | ...................... G06K 9/6293 |
| 2014/0110583 | A1 | 4/2014 | Wu | |

FOREIGN PATENT DOCUMENTS

| | | |
|---|---|---|
| CN | 106357922 A | 1/2017 |
| CN | 106506794 A | 3/2017 |
| CN | 107450817 A | 12/2017 |
| JP | 2016192760 A | 11/2016 |
| KR | 20130043486 A | 4/2013 |

OTHER PUBLICATIONS

First Office Action from China patent office in a counterpart Chinese patent Application 201710644147.8, dated Mar. 18, 2019 (8 pages).
European search report, EP18842120, dated Apr. 28, 2020 (8 pages).
English translation of Second Office Action from China patent office in a counterpart Chinese patent Application 201710644147.8, dated Jun. 24, 2019 (12 pages).
Indian Examination Report for IN Application 201917052828 dated Jan. 29, 2021. (5 pages).

\* cited by examiner

US 11,094,267 B2

PROXIMITY DETECTION METHOD, STORAGE MEDIUM, AND ELECTRONIC DEVICE

CROSS-REFERENCE TO RELATED APPLICATION(S)

The present application is a continuation application of International Patent Application No. PCT/CN2018/094448, filed on Jul. 4, 2018, which claims priority to Chinese patent application No. 201710644147.8, filed on Jul. 31, 2017, the entire contents of both of which are hereby incorporated by reference in their entireties.

TECHNICAL FIELD

The described embodiments relate to the technical field of sensors, particularly to a proximity detection method, a storage medium, and an electronic device.

BACKGROUND

When a user makes a call by use of a terminal, a proximity sensor may detect whether the user is bringing the terminal close to the face. If it is detected that the user is bringing a display screen of the terminal close to the face, the terminal may have backlight of the display screen turned off, thereby achieving effects of saving power and preventing mistaken touch. If it is detected that the user is moving the terminal display screen away from the face, the terminal may have the display screen illuminated.

SUMMARY

Embodiments of the present disclosure provide a proximity detection method, apparatus, a storage medium, and an electronic device, which can improve diversity of proximity detection performed by a terminal in a bright light environment.

Embodiments of the present disclosure may provide a proximity detection method. The method may include the following operations.

Acquiring an ambient light intensity value.

Detecting whether a terminal is in a bright light environment according to the ambient light intensity value.

In response to the terminal being in the bright light environment, reading at least one group of proximity values output by a proximity sensor. Each group of proximity values comprises proximity values output by the proximity sensor in response to a transmitting end of the proximity sensor being sequentially controlled not to transmit a detection signal, to transmit the detection signal, to transmit the detection signal, and not to transmit the detection signal. and Calculating a target proximity value according to the at least one group of proximity values, and performing proximity detection according to the target proximity value.

Embodiments of the present disclosure may provide a storage medium having computer programs stored therein, when being executed by a computer, the computer programs cause the computer to perform operations of: acquiring an ambient light intensity value; in response to the ambient light intensity value being greater than a preset light intensity threshold, controlling, sequentially, a proximity sensor not to transmit a detection signal and obtain a first proximity value, to transmit the detection signal and obtain a second proximity value, to transmit the detection signal and obtain a third proximity value, and not to transmit the detection signal and obtain a fourth proximity value; and performing proximity detection according to the first, second, third and fourth proximity values.

Embodiments of the present disclosure may provide an electronic device. The electronic device may include a non-transitory memory and a processor. The processor may be configured to call computer programs stored in the non-transitory memory to: acquire an ambient light intensity value; control, sequentially, a proximity sensor not to transmit a detection signal and detect a first proximity value, to transmit a detection signal and detect a second proximity value, to transmit a detection signal and detect a third proximity value, and not to transmit a detection signal and detect a fourth proximity value in response to the ambient light intensity value being greater than a preset light intensity threshold; and perform a preset operation corresponding to a proximity state of the terminal in response to a target proximity value being greater than a preset first threshold, wherein the target proximity value is calculated according to the first, second, third and fourth proximity values.

BRIEF DESCRIPTION OF DRAWINGS

The technical solutions of the present application and the beneficial effects thereof will be apparent from the detailed description of the specific embodiments of the present application in connection with the drawings in the embodiments of the present disclosure.

DETAILED DESCRIPTION

Figure 1:
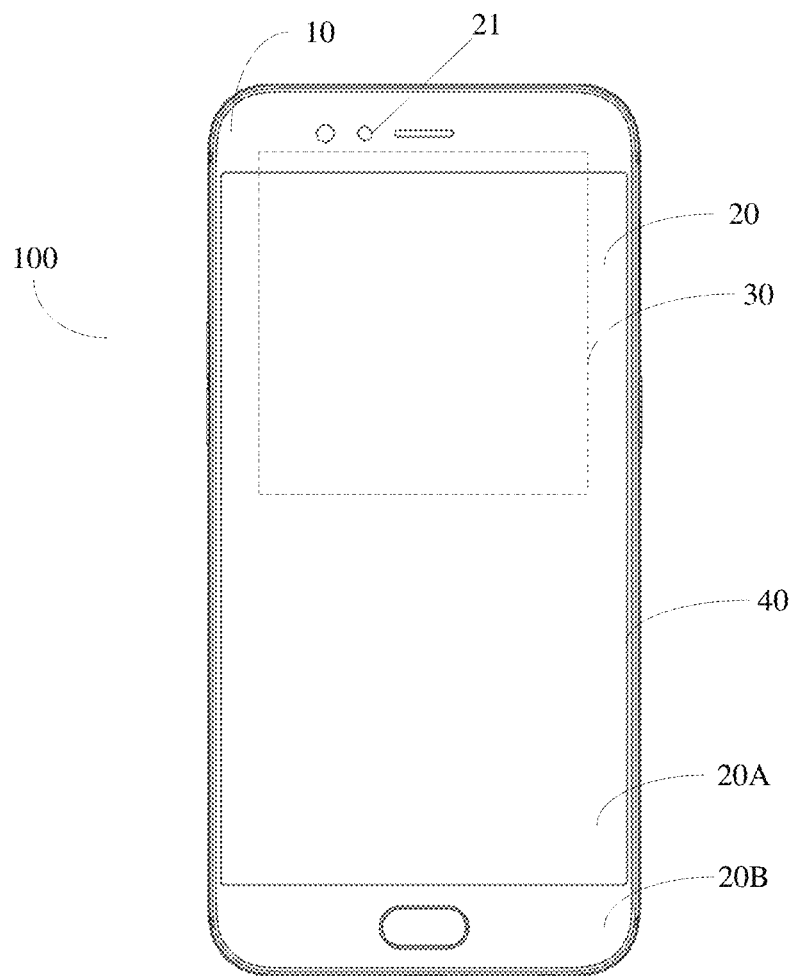
FIG. 1 is a structural diagram of an electronic device according to an embodiment of the present disclosure.

Referring to the drawings, same reference numerals represent the same components, the principles of the present application are illustrated by the implementation in a suitable computing environment. The following description is based on the specific embodiments of the present disclosure as illustrated, and not intended to limit the present disclosure.

In the description of the embodiments of the present application, the terms "first" and "second" are used for descriptive purposes only, and are not intended to indicate or imply a relative importance or implicitly indicating the number of technical features indicated. Thus, features defining "first" or "second" may include one or more of the described features either explicitly or implicitly. In the description of the embodiments of the present application, the meaning of "a plurality" is two or more unless specifically defined otherwise.

The details will be described below.

Referring to FIG. 1, an electronic device 100 may include a cover plate 10, a display screen 20, a circuit board 30, and a housing 40.

The cover plate 10 is mounted onto the display screen 20 to cover the display screen 20. The cover plate 10 may be a transparent glass cover plate. In some embodiments, the cover plate 10 may be a glass cover plate made of a material, for example, sapphire.

The display screen 20 is mounted onto the housing 40 to form a display surface of the electronic device 100. The display screen 20 may include a display area 20A and a non-display area 20B. The display area 20A is configured to display information, such as images, texts, and the like. The non-display area 20B does not display information. Functional components, such as a fingerprint module and a touch control circuit, may be disposed at a bottom of the non-display area 20B.

A proximity sensor and an ambient light sensor may be disposed at a top of the non-display area 20B. The proximity sensor may detect whether the user is holding the device close to the face during a call. If it is detected that the user is holding the device close to the face, the device may have backlight of the display screen turned off. If it is detected that the user is moving the device away from the face, the device may have the display screen illuminated. The ambient light sensor may detect intensity of ambient light to automatically adjust brightness of the display screen, or control illumination and turning-off of the press-key light. In an embodiment, the proximity sensor and the ambient light sensor may be disposed at an opening 21 of the non-display area 20B.

Figure 2:
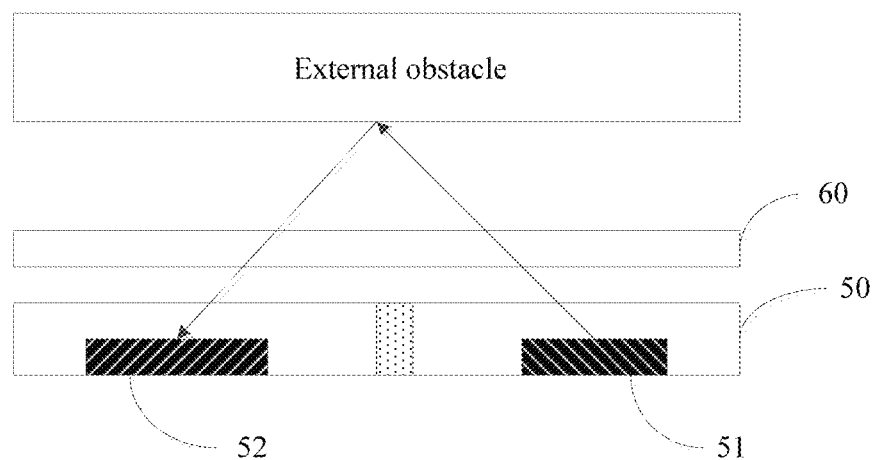
FIG. 2 is a diagram of operation of a proximity sensor according to an embodiment of the present disclosure.

FIG. 2 shows a diagram of operation of a proximity sensor. A proximity sensor 50 may include a transmitting end 51 and a receiving end 52. The transmitting end 51 may transmit outward an infrared (IR) detection signal which may pass through a glass cover plate 60. When there is an obstacle in front of the proximity sensor 50, the infrared detection signal is reflected by the obstacle, before entering the receiving end 52. After receiving the infrared detection signal, the receiving end 52 may output a proximity value according to intensity of the received infrared detection signal. If the proximity value is greater than a predetermined threshold, the device may be determined to be in a proximity state. If the proximity value is less than a predetermined threshold, the device may be determined to be in a remote state.

The circuit board 30 is mounted inside the housing 40. The proximity sensor and the ambient light sensor may be connected to the circuit board 30 to transmit output values of the sensors to a processor of the electronic device for processing.

It may be understood that, the execution subject of the embodiment of the present disclosure may be an electronic terminal device, for example, a smart phone or a tablet computer.

Embodiments of the present disclosure may provide a proximity detection method, which may include the following operations.

An ambient light intensity value may be acquired.

Whether a terminal is in a bright light environment is detected according to the ambient light intensity value.

At least one group of proximity values output by a proximity sensor may be read in response to the terminal being in the bright light environment. Each group of proximity values may include proximity values output by the proximity sensor in response to a transmitting end of the proximity sensor being sequentially controlled not to transmit a detection signal, to transmit the detection signal, to transmit the detection signal, and not to transmit the detection signal.

A target proximity value may be calculated according to the at least one group of proximity values, and proximity detection may be performed according to the target proximity value.

In some embodiments, that the target proximity value is calculated according to the at least one group of proximity values may include:

The proximity values output by the proximity sensor in response to the transmitting end of the proximity sensor sequentially not transmitting a detection signal, transmitting a detection signal, transmitting a detection signal, and not transmitting a detection signal, may be determined as a first proximity value may be determined as a first proximity value, a second proximity value, a third proximity value, and a fourth proximity value, respectively.

A sum of the second proximity value and the third proximity value may be calculated to obtain a first sum value.

A sum of the first proximity value and the fourth proximity value may be calculated to obtain a second sum value.

A difference value between the first sum value and the second sum value may be calculated, and one-half of the difference may be determined as the target proximity value.

In some embodiments, that the target proximity value is calculated according to the at least one group of proximity values may include:

The proximity values output by the proximity sensor in response to the transmitting end of the proximity sensor sequentially not transmitting a detection signal, transmitting a detection signal, transmitting a detection signal, and not transmitting a detection signal, may be determined as a first proximity value may be determined as a first proximity value, a second proximity value, a third proximity value, and a fourth proximity value, respectively.

A difference between the second proximity value and the first proximity value may be calculated to obtain a first difference value.

A difference between the third proximity value and the fourth proximity value may be calculated to obtain a second difference value.

An average value of the first difference value and the second difference value may be calculated, and the average value may be determined as the target proximity value.

In some embodiments, that the proximity detection is performed according to the target proximity value may include: the terminal may be determined to be in a proximity state in response to the target proximity value being greater than a preset first threshold.

In some embodiments, the method may further include: the terminal may be determined to be in a remote state in response to the target proximity value being less than a preset second threshold. The preset second threshold is less than the preset first threshold.

In some embodiments, that whether the terminal is in a bright light environment is detected according to the ambient light intensity value may include: whether the ambient light intensity value is greater than a preset light intensity threshold may be detected. The terminal may be determined to be in the bright light environment in response to the ambient light intensity value being greater than the preset light intensity threshold. The terminal may be not determined to be in the bright light environment in response to the ambient light intensity value being less than or equal to the preset light intensity threshold.

In some embodiments, the method may further include: values of the preset first threshold and the preset second threshold may be adjusted according to variations in response to receiving an instruction carrying the variations.

Figure 3:
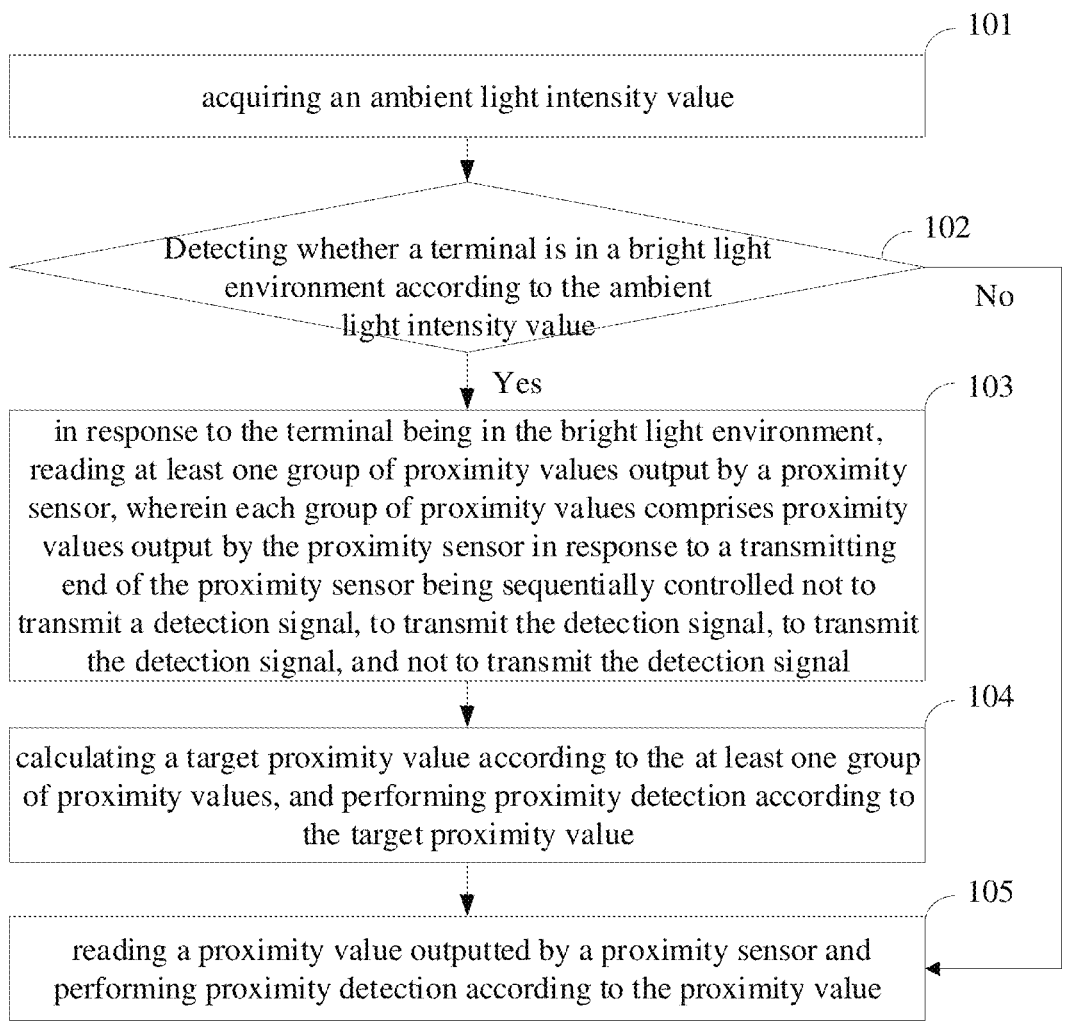
FIG. 3 is a flow chart diagram of a proximity detection method according to some embodiments of the present disclosure.

Reference is made to FIG. 3, which is a flow chart diagram of a proximity detection method according to an embodiment of the present disclosure, where the method may include the following operations.

In block 101, an ambient light intensity value may be acquired.

In block 102, whether the terminal is in a bright light environment may be detected according to the ambient light intensity value.

For example, operations in block 101 and block 102 may include the following operations.

When a terminal makes a call, the terminal may first acquire an ambient light intensity value in a current environment through an ambient light sensor. Then, the terminal may detect whether the terminal is in a bright light environment according to the ambient light intensity value.

If it is detected that the terminal is not in the bright light environment, operation in block 105 may be proceeded, the terminal may directly read a proximity value outputted by a proximity sensor and perform proximity detection according to the proximity value.

If it is detected that the terminal is in the bright light environment, operation in block 103 may be proceeded.

In block 103, at least one group of proximity values output by the proximity sensor may be read. Each group of proximity values may include proximity values output by the proximity sensor in response to a transmitting end of the proximity sensor being sequentially controlled not to transmit a detection signal, to transmit a detection signal, to transmit a detection signal, and not to transmit a detection signal.

For example, in the case of detecting that the terminal is in the bright light environment, the terminal may read at least one group of proximity values output by the proximity sensor. Each group of proximity values may include proximity values output by the proximity sensor when the transmitting end of the proximity sensor sequentially does not transmit a detection signal, transmits a detection signal, transmits a detection signal and does not transmit a detection signal.

For example, in the case of detecting that the terminal is in the bright light environment, the terminal may read a group of proximity values output by the proximity sensor. The group of proximity values are proximity values output by the proximity sensor and collected when the transmitting end of the proximity sensor is sequentially controlled not to transmit an infrared detection signal outward, to transmit an infrared detection signal outward, to transmit an infrared detection signal outward, and not to transmit an infrared detection signal outward.

That is, the terminal may perform four samplings. During the first sampling, the terminal may control the transmitting end of the proximity sensor not to transmit an infrared detection signal outward. At this time, the proximity value output by the proximity sensor may be a proximity value calculated by a receiving end of the proximity sensor according to intensity of infrared rays in external ambient light after the infrared rays in the external ambient light enter the receiving end. During the second sampling, the terminal may control the transmitting end of the proximity sensor to transmit an infrared detection signal outward. At this time, the proximity value output by the proximity sensor is a proximity value calculated by the receiving end according to intensity of the received infrared rays after the infrared rays emitted by the transmitting end having been reflected via an obstacle and the infrared rays in the external ambient light enter the receiving end of the proximity sensor.

During the third sampling, the terminal may also control the transmitting end of the proximity sensor to transmit an infrared detection signal outward, thereby obtaining a proximity value. During the fourth sampling, the terminal may control the transmitting end of the proximity sensor not to transmit an infrared detection signal outward, thereby obtaining another proximity value.

In block 104, a target proximity value may be calculated according to the at least one group of proximity values, and proximity detection may be performed according to the target proximity value.

For example, after acquiring a group of proximity values output by the proximity sensor, the terminal may calculate a target proximity value according to the group of proximity values. The terminal may then perform proximity detection according to the target proximity value.

It may be understood that the embodiment of the present disclosure may collect a group of proximity values output by the proximity sensor when the terminal is in the bright light environment. The group of proximity values are proximity values obtained when the transmitting end of the proximity sensor is sequentially controlled not to transmit a detection signal outward, to transmit a detection signal outward, to transmit a detection signal outward, and not to transmit a detection signal outward. Then, the terminal may calculate a target proximity value according to the group of proximity values, and perform proximity detection according to the target proximity value. Therefore, the embodiment of the present disclosure may improve diversity of proximity detection performed by the terminal in the bright light environment.

Figure 4:
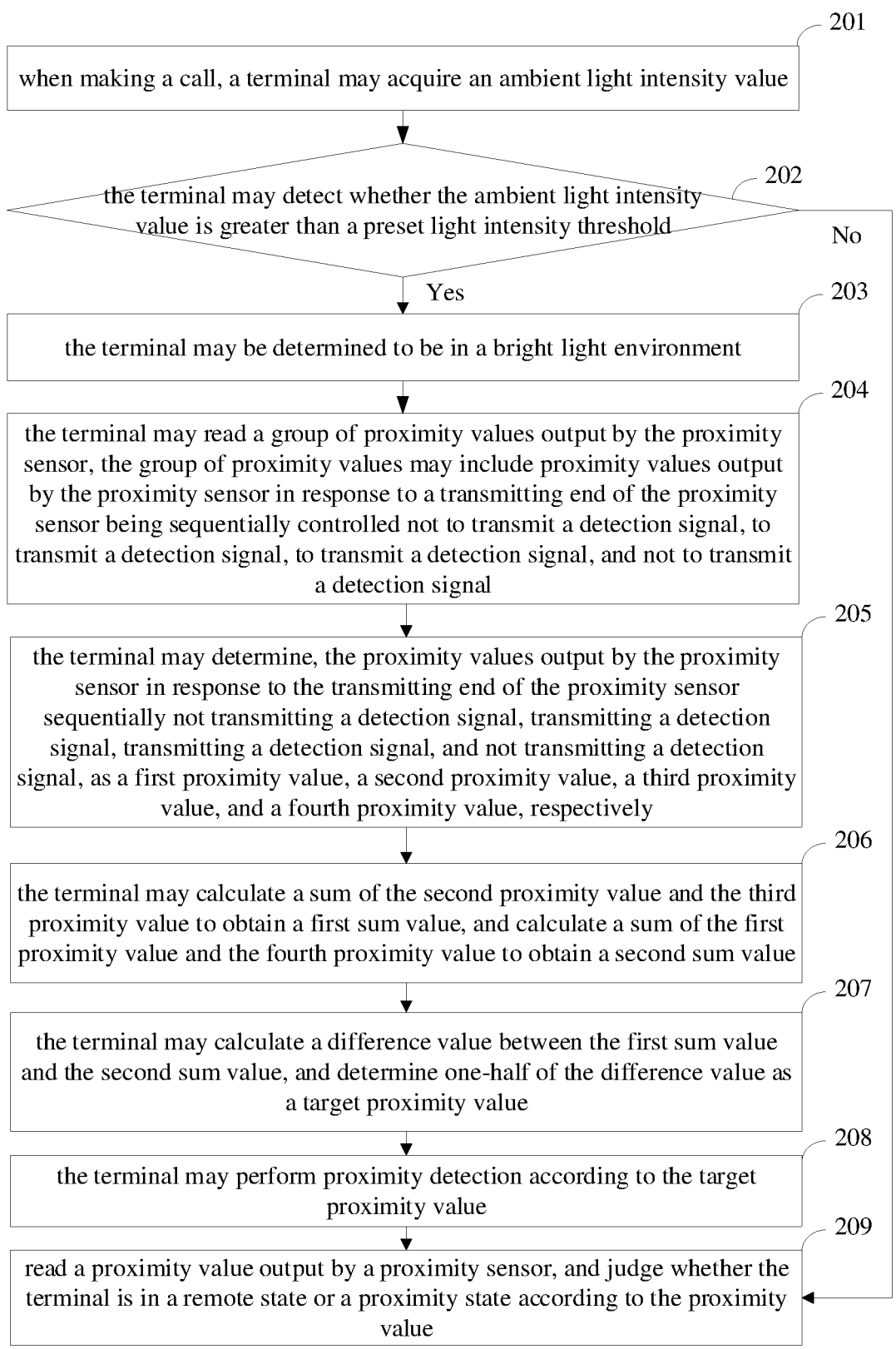
FIG. 4 is another flow chart diagram of a proximity detection method according to some embodiments of the present disclosure.

Reference is made to FIG. 4, which is another flow chart diagram of a proximity detection method according to an embodiment of the present disclosure, where the flow may include the following.

In block 201, a terminal, when making a call, may acquire an ambient light intensity value.

In block 202, the terminal may detect whether the ambient light intensity value is greater than a preset light intensity threshold.

In block 203, if it is detected that the ambient light intensity value is greater than the preset light intensity threshold, the terminal may be determined to be in a bright light environment.

For example, when making the call, the terminal may first acquire an ambient light intensity value in a current environment through an ambient light sensor. Then, the terminal may detect whether the acquired ambient light intensity value is greater than a preset light intensity threshold. For example, the preset light intensity threshold may be 6000 lux, or 7000 lux, etc., and the examples herein do not constitute a limitation of the present disclosure.

If it is detected that the ambient light intensity value is not greater than the preset light intensity threshold, the terminal may be determined not to be in a bright light environment at this time. In this case, operation in block 209 may be proceeded, the terminal may directly read a proximity value output by a proximity sensor, and judge whether the terminal is in a remote state or a proximity state according to the proximity value.

If it is detected that the ambient light intensity value is greater than the preset light intensity threshold, the terminal may be determined to be currently in a bright light environment, operations in block 204 may be proceeded. When the terminal is in the bright light environment, for example, the terminal is in an outdoor environment with strong sunlight, a receiving end of the proximity sensor may receive extremely strong infrared rays from the surrounding. That is, when the terminal is in the bright light environment, infrared rays from the external environment may result in interference with the proximity sensor.

In block 204, the terminal may read a group of proximity values output by the proximity sensor, the group of proximity values may include proximity values output by the proximity sensor in response to a transmitting end of the proximity sensor being sequentially controlled not to transmit a detection signal, to transmit a detection signal, to transmit a detection signal, and not to transmit a detection signal.

For example, the terminal, when determined to be in the bright light environment, may collect proximity values via the proximity sensor four times. The four collection processes involve proximity values read by the terminal and output by the proximity sensor in response to the transmitting end of the proximity sensor being sequentially controlled not to transmit an infrared detection signal outward, to transmit an infrared detection signal outward, to transmit an infrared detection signal outward, and not to transmit an infrared detection signal outward.

That is, when a proximity value is collected for the first time, the terminal may control the transmitting end of the proximity sensor not to transmit an infrared detection signal outward. At this time, the proximity value output by the proximity sensor is a proximity value calculated by the receiving end of the proximity sensor according to intensity of infrared rays in external ambient light after the infrared rays in the external ambient light enter the receiving end. When a proximity value is collected for the second time, the terminal may control the transmitting end of the proximity sensor to transmit an infrared detection signal outward. At this time, the proximity value output by the proximity sensor is a proximity value calculated by the receiving end according to intensity of the received infrared rays after the infrared rays emitted by the transmitting end having been reflected via an obstacle and the infrared rays in the external ambient light enter the receiving end of the proximity sensor.

When a proximity value is collected for the third time, the terminal may also control the transmitting end of the proximity sensor to transmit an infrared detection signal outward, thereby obtaining a proximity value. When a proximity value is collected for the fourth time, the terminal may control the transmitting end of the proximity sensor not to transmit an infrared detection signal outward, thereby obtaining another proximity value.

In block 205, the terminal may determine, the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively.

In block 206, the terminal may calculate a sum of the second proximity value and the third proximity value to obtain a first sum value, and calculate a sum of the first proximity value and the fourth proximity value to obtain a second sum value.

In block 207, the terminal may calculate a difference value between the first sum value and the second sum value, and determine one-half of the difference value as a target proximity value.

For example, blocks 205, 206, 207 may include the following operations.

After collecting four proximity values, the terminal may determine, the proximity values collected when the transmitting end of the proximity sensor sequentially does not transmit an infrared detection signal outward, transmits an infrared detection signal outward, transmits an infrared detection signal outward, and does not transmit an infrared detection signal outward, as a first proximity value, a second proximity value, a third proximity value, and a fourth proximity value, respectively.

Then, the terminal may calculate a sum of the second proximity value and the third proximity value to obtain the first sum value. At the same time, the terminal may calculate the sum of the first proximity value and the fourth proximity value to obtain the second sum value.

Next, the terminal may calculate a difference value between the first sum value and the second sum value, and determine one-half of the difference value as the target proximity value.

In block 208, the terminal may perform proximity detection according to the target proximity value.

For example, after calculating the target proximity value, the terminal may perform proximity detection according to the target proximity value.

It should be noted that, in related art, in a bright light environment, a terminal, when performing proximity detection, may collect two proximity values through a proximity sensor. The proximity value collected for the first time is a proximity value, for example, a, read by the terminal and output by the proximity sensor when the transmitting end of the proximity sensor does not transmit an infrared detection signal outward. The value a is a proximity value calculated by the receiving end of the proximity sensor according to intensity of infrared rays in external ambient light after the infrared rays in the external ambient light enter the receiving end. The proximity value collected for the second time is a proximity value, for example, b, read by the terminal and output by the proximity sensor when the transmitting end of the proximity sensor transmits an infrared detection signal outward. The value b is a proximity value calculated by the receiving end according to intensity of the received infrared rays after the infrared rays emitted by the transmitting end having been reflected by an obstacle and the infrared rays in the external ambient light enter the receiving end of the proximity sensor. It may be understood that, a difference value (i.e., b−a) between the values b and a is a proximity value obtained in a manner that the infrared rays transmitted outward by the transmitting end of the proximity sensor are reflected by the obstacle before entering the receiving end. That is, the terminal performs proximity detection according to the difference value between the values b and a.

Figure 5:
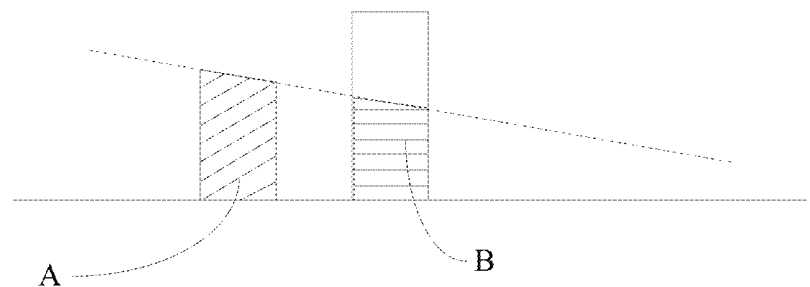
FIG. 5 is a diagram of oblique-line influence of infrared light in ambient light on proximity values according to some embodiments of the present disclosure.

However, as a matter of fact, interference of the infrared rays in the external environment with the receiving end of the proximity sensor exerts oblique-line influence. For example, as shown in FIG. 5, a shaded portion A represents a proximity value calculated by the receiving end according to intensity of infrared rays in external ambient light after the infrared rays in the external ambient light enter the receiving end of the proximity sensor, in the case that the transmitting end of the proximity sensor does not transmit an infrared detection signal outward. A shaded portion B represents a corresponding proximity value portion after the infrared rays in the ambient light enter the receiving end of the proximity sensor, in the case that the transmitting end of the proximity sensor transmits an infrared detection signal outward. As can be seen from the figure, an area of the shaded portion A is different from that of the shaded portion B. Therefore, in a bright light environment, there is an error between the proximity value b-a calculated above and a real proximity value.

In some embodiments of the present disclosure, the terminal collects proximity values via the proximity sensor four times. The four collection processes involve proximity values read by the terminal and output by the proximity sensor when the transmitting end of the proximity sensor are sequentially controlled not to transmit an infrared detection signal outward, to transmit an infrared detection signal outward, to transmit an infrared detection signal outward, and not to transmit an infrared detection signal outward. Since the interference of the infrared rays in the external environment with the receiving end of the proximity sensor exerts oblique-line influence, as for four proximity values collected by the terminal, variations in the proximity values after the infrared rays in the external ambient light enter the receiving end in the sequence of the collection time are identical.

Figure 6:
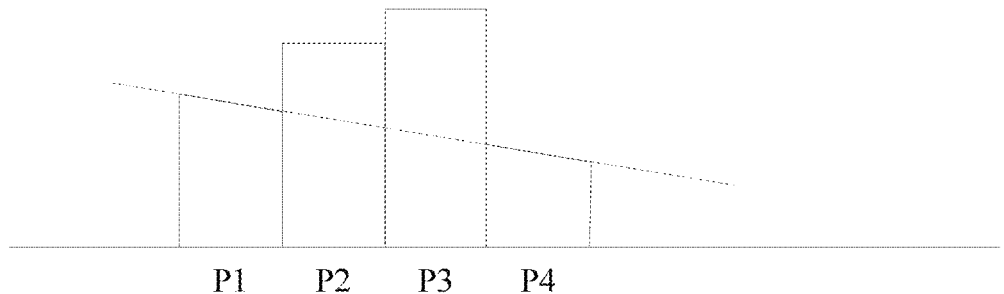
FIG. 6 is a diagram of comparison of four proximity values acquired according to some embodiments of the present disclosure.

As shown in FIG. 6, a proximity value collected for the first time is P1=a, for example. Since the proximity value collected for the first time is a proximity value obtained in the case that the transmitting end of the proximity sensor does not transmit an infrared detection signal outward, a is a corresponding proximity value of the infrared rays in the external ambient light.

Collecting a proximity value for the second time is performed in the case that the transmitting end of the proximity sensor transmits an infrared detection signal outward. For example, the infrared detection signal transmitted outward by the transmitting end is reflected by an obstacle in the surrounding before entering the receiving end, and a corresponding proximity value of the reflected infrared detection signal is s1. A corresponding proximity value of the infrared rays in the external ambient light after entering the receiving end is a+x, where x is a variation in the proximity value of the infrared rays in the external ambient light after entering the receiving end. It may be understood that, in actual application scenario, the value of x may be positive or negative. For example, the proximity value collected for the second time is P2=s1+a+x.

Collecting a proximity value for the third time is also performed in the case that the transmitting end of the proximity sensor transmits an infrared detection signal outward. For example, the infrared detection signal transmitted outward by the transmitting end is reflected by an obstacle in the surrounding before entering the receiving end, and a corresponding proximity value of the reflected infrared detection signal is s2. A corresponding proximity value of the infrared rays in the external ambient light after entering the receiving end is a+2x. For example, the proximity value collected for the third time is P3=s2+a+2x.

The proximity value collected for the fourth time is a proximity value obtained in the case that the transmitting end of the proximity sensor does not transmit an infrared detection signal outward. For example, the proximity value collected for the fourth time is P4=a+3x.

After collecting P1, P2, P3, and P4, the terminal may perform proximity value calculation according to PS_code=PS_on−PS_off. Therein, PS_code represents a real value of a corresponding proximity value after the infrared detection signal transmitted outward by the transmitting end is reflected by an obstacle and enters the receiving end; PS_on represents a proximity value output by the proximity sensor in the case that the transmitting end transmits an infrared detection signal outward, and PS_off represents a proximity value output by the proximity sensor in the case that the transmitting end does not transmit an infrared detection signal outward.

That is, P2−P1=(s1+a+x)−a=s1+x. P3−P4=(s2+a+2x)−(a+3x)=s2−x. Then, the terminal may calculate an average value of s1+x and s2−x to obtain (s1+s2)/2. Next, the terminal may determine the average value (s1+s2)/2 as the target proximity value of the proximity sensor, and make proximity determination according to the target proximity value. It can be learned from the average value (s1+s2)/2 that, a and x are not included in the average value, that is, the average value has removed infrared interference in the external ambient light.

That is, in an embodiment, after acquiring the group of proximity values output by the proximity sensor, the terminal may calculate the target proximity value by the following operations. The group of proximity values are proximity values output by the proximity sensor in response to the transmitting end of the proximity sensor being sequentially controlled not to transmit a detection signal, to transmit a detection signal, to transmit a detection signal, and not to transmit a detection signal.

The proximity values output by the proximity sensor in response to the transmitting end of the proximity sensor sequentially not transmitting a detection signal, transmitting a detection signal, transmitting a detection signal, and not transmitting a detection signal may be determined as a first proximity value, a second proximity value, a third proximity value, and a fourth proximity value, respectively.

A difference between the second proximity value and the first proximity value may be calculated to obtain a first difference value.

A difference between the third proximity value and the fourth proximity value may be calculated to obtain a second difference value.

An average value of the first difference value and the second difference value may be calculated, and the average value may be determined as the target proximity value.

Of course, it is also possible to calculate a sum of P2 and P3 (a first sum value) firstly, and a sum of P1 and P4 (a second sum value), i.e., P2+P3=s1+a+x+s2+a+2x=s1+s2+2a+3x, P1+P4=a+a+3x=2a+3x. Then, the terminal further calculates a difference value between the first sum value and the second sum value, that is, (s1+s2+2a+3x)−(2a+3x)=s1+s2. Next, the terminal may determine one-half of the difference value between the first sum value and the second sum value as the target proximity value of the proximity sensor, i.e., (s1+s2)/2.

In some embodiments, that the terminal may perform proximity detection according to the target proximity value may include the following operation.

The terminal may be determined to be in a proximity state in response to the target proximity value being greater than a preset first threshold.

For example, if the value of the preset first threshold is 400, the terminal may be determined to be in a proximity state in response to the calculated target proximity value being greater than 400, thereby triggering the terminal to perform operations, for example, turning off the backlight of the display screen or the like.

In some embodiments, the embodiment of the present disclosure may further include the following operations.

The terminal may be determined to be in a remote state in response to the target proximity value being less than a preset second threshold. The preset second threshold is less than the preset first threshold.

For example, a value of the preset second threshold may be 300. Accordingly, in response to the calculated target proximity value being less than 300, the terminal may be determined to be in a remote state, thereby triggering the terminal to perform an operation of illuminating the display screen or the like.

In other embodiments, the terminal may further adjust the preset first threshold and the preset second threshold according to actual use needs. For example, in response to receiving an instruction of adjusting the preset first threshold and the preset second threshold, the terminal may adjust the preset first threshold and the preset second threshold according to the instruction. The instruction may carry values that the preset first threshold and preset second threshold to be adjusted to, or the instruction may carry variations and instruct the terminal to adjust the preset first threshold and the preset second threshold according to the variations.

That is, in some embodiments, the present embodiment may further include the following operation.

In response to receiving an instruction carrying variations, values of the preset first threshold and the preset second threshold are adjusted according to the variations.

In some embodiments, a proximity detection apparatus may be provided. The proximity detection apparatus may include the following modules.

An acquisition module, configured to acquire an ambient light intensity value.

A detection module, configured to detect whether a terminal is in a bright light environment according to the ambient light intensity value.

A reading module, configured to read at least one group of proximity values output by a proximity sensor in response to the terminal being in the bright light environment. Each group of proximity values comprises proximity values output by the proximity sensor in response to a transmitting end of the proximity sensor being sequentially controlled not to transmit a detection signal, to transmit the detection signal, to transmit the detection signal, and not to transmit the detection signal.

A calculation module, configured to calculate a target proximity value according to the at least one group of proximity values, and perform proximity detection according to the target proximity value.

In some embodiments, the calculation module may be configured to:

Determine the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively.

Calculate a sum of the second proximity value and the third proximity value to obtain a first sum value.

Calculate a sum of the first proximity value and the fourth proximity value to obtain a second sum value.

Calculate a difference value between the first sum value and the second sum value, and determine one-half of the difference as the target proximity value.

In some embodiments, the calculation module may be configured to:

Determine, the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively.

Calculate a difference between the second proximity value and the first proximity value to obtain a first difference value.

Calculate a difference between the third proximity value and the fourth proximity value to obtain a second difference value.

Calculate an average value of the first difference value and the second difference value, and determine the average value as the target proximity value.

In some embodiments, the calculation module may be configured to determine the terminal to be in a proximity state in response to the target proximity value being greater than a preset first threshold; and determine the terminal to be in a remote state in response to the target proximity value being less than a preset second threshold, wherein the preset second threshold is less than the preset first threshold.

In some embodiments, the detection module may be configured to detect whether the ambient light intensity value is greater than a preset light intensity threshold; determine the terminal to be in the bright light environment in response to the ambient light intensity value being greater than the preset light intensity threshold; and determine the terminal not to be in the bright light environment in response to the ambient light intensity value being less than or equal to the preset light intensity threshold.

In some embodiments, the calculation module may be configured to adjust values of the preset first threshold and the preset second threshold according to variations in response to receiving an instruction carrying the variations.

Figure 7:
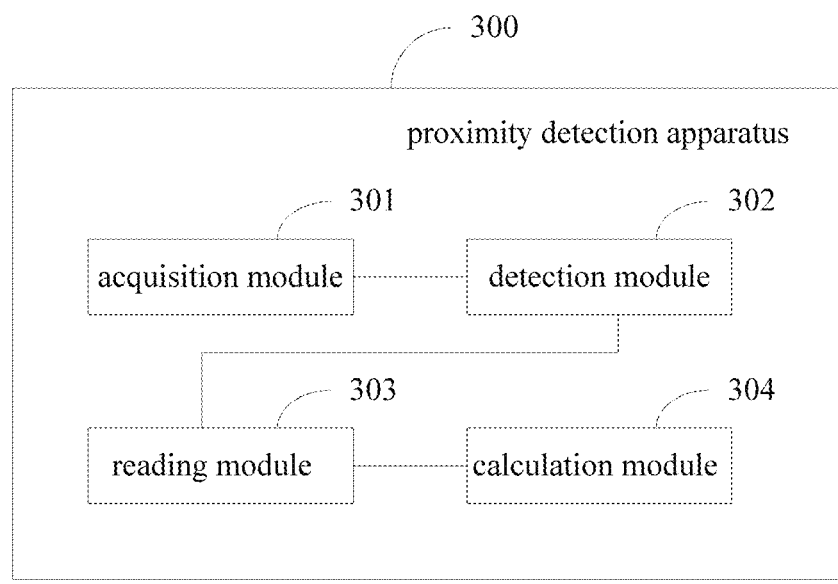
FIG. 7 is a structural diagram of a proximity detection apparatus according to some embodiments of the present disclosure.

Reference is made to FIG. 7, which is a structural diagram of a proximity detection apparatus according to an embodiment of the present disclosure. The proximity detection apparatus 300 may include an acquisition module 301, a detection module 302, a reading module 303, and a calculation module 304.

The acquisition module 301 may be configured to acquire an ambient light intensity value.

The detection module 302 may be configured to detect whether the terminal is in a bright light environment according to the ambient light intensity value.

For example, when the terminal makes a call, the acquisition module 301 may first acquire an ambient light intensity value in a current environment via an ambient light sensor. Then, the detection module 302 may detect whether the terminal is in a bright light environment according to the ambient light intensity value.

If it is detected that the terminal is not in the bright light environment, the terminal may directly read a proximity value output by a proximity sensor and perform proximity detection according to the proximity value.

The reading module 303 is configured to: read at least one group of proximity values output by the proximity sensor, if it is detected that the terminal is in the bright light environment. Each group of proximity values may include proximity values output by the proximity sensor in response to a transmitting end of the proximity sensor being sequentially controlled not to transmit a detection signal, to transmit a detection signal, to transmit a detection signal and not to transmit a detection signal.

For example, in the case that the detection module 302 determines the terminal to be in the bright light environment, the reading module 303 may collect proximity values via the proximity sensor four times. The four collection processes involve proximity values read by the terminal and output by the proximity sensor in response to the transmitting end of the proximity sensor being sequentially controlled not to transmit an infrared detection signal outward, to transmit an infrared detection signal outward, to transmit an infrared detection signal outward, and not to transmit an infrared detection signal outward.

That is, when a proximity value is collected for the first time, the reading module 303 may control the transmitting end of the proximity sensor not to transmit an infrared detection signal outward. At this time, the proximity value output by the proximity sensor is a proximity value calculated by the receiving end of the proximity sensor according to intensity of infrared rays in external ambient light after the infrared rays in the external ambient light enter the receiving end. When a proximity value is collected for the second time, the reading module 303 may control the transmitting end of the proximity sensor to transmit an infrared detection signal outward. At this time, the proximity value output by the proximity sensor is a proximity value calculated by the receiving end according to intensity of the received infrared rays after the infrared rays emitted by the transmitting end having been reflected via an obstacle and the infrared rays in the external ambient light enter the receiving end of the proximity sensor.

When a proximity value is collected for the third time, the reading module 303 may also control the transmitting end of the proximity sensor to transmit an infrared detection signal outward, thereby obtaining a proximity value. When a proximity value is collected for the fourth time, the reading module 303 may control the transmitting end of the proximity sensor not to transmit an infrared detection signal outward, thereby obtaining another proximity value.

The calculation module 304 is configured to calculate a target proximity value according to the at least one group of proximity values, and perform proximity detection according to the target proximity value.

For example, after the reading module 303 acquires a group of proximity values output by the proximity sensor, the calculation module 304 may calculate a target proximity value according to the group of proximity values. Then, the calculation module 304 may perform proximity detection according to the target proximity value.

It may be understood that the embodiments of the present disclosure may collect a group of proximity values output by the proximity sensor when the terminal is in the bright light environment. The group of proximity values may include proximity values obtained when the transmitting end of the proximity sensor is sequentially controlled not to transmit a detection signal outward, to transmit a detection signal outward, to transmit a detection signal outward, and not to transmit a detection signal outward. Then, the terminal may calculate a target proximity value according to the group of proximity values, and perform proximity detection according to the target proximity value. Therefore, embodiments of the present disclosure may improve diversity of proximity detection performed by the terminal in the bright light environment.

In some embodiments, the calculation module 304 may be configured to:

Determine the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively.

Calculate a sum of the second proximity value and the third proximity value to obtain a first sum value.

Calculate a sum of the first proximity value and the fourth proximity value to obtain a second sum value.

Calculate a difference value between the first sum value and the second sum value, and determine one-half of the difference as the target proximity value.

For example, after collecting four proximity values, the calculation module 304 may determine, the proximity values collected in response to the transmitting end of the proximity sensor sequentially not transmitting an infrared detection signal outward, transmitting an infrared detection signal outward, transmitting an infrared detection signal outward, and not transmitting an infrared detection signal outward, as a first proximity value, a second proximity value, a third proximity value, and a fourth proximity value, respectively.

Then, the calculation module 304 may calculate a sum of the second proximity value and the third proximity value to obtain a first sum value; and meanwhile, the calculation module 304 may calculate a sum of the first proximity value and the fourth proximity value to obtain a second sum value.

Next, the calculation module 304 may calculate a difference value between the first sum value and the second sum value, and determine one-half of the difference value as the target proximity value.

For example, the proximity value collected for the first time is $P1=a$; the proximity value collected for the second time is $P2=s1+a+x$; the proximity value collected for the third time is $P3=s2+a+2x$; and the proximity value collected for the fourth time is $P4=a+3x$. Therein, a is a proximity value output by the proximity sensor in the case that the transmitting end of the proximity sensor does not transmit an infrared detection signal outward, so the a is a corresponding proximity value of the infrared rays in the external ambient light during the first collection process. The x is a variation in the proximity value after the infrared rays in the external ambient light enter the receiving end during each proximity value collection, as compared to a previous proximity value collection.

Accordingly, $P2+P3=s1+a+x+s2+a+2x=s1+s2+2a+3x$, $P1+P4=a+a+3x=2a+3x$. $(P2+P3)-(P1+P4)=(s1+s2+2a+3x)-(2a+3x)=s1+s2$. Thus, the calculation module 304 may determine one-half of $s1+s2$ as the target proximity value, i.e., $(s1+s2)/2$.

It may be known from the average value $(s1+s2)/2$ that the a and the x are not included in the average value, that is, the average value has removed the infrared interference in the external ambient light.

In some embodiments, the calculation module 304 may be configured to:

Determine the terminal to be in a proximity state in response to the target proximity value being greater than a preset first threshold.

Determine the terminal to be in a remote state in response to the target proximity value being less than a preset second threshold. The preset second threshold is less than the preset first threshold.

For example, when the calculation module 304 performs proximity detection according to the target proximity value, the calculation module 304 may determine the terminal to be in a proximity state if it is detected that the target proximity value is greater than the preset first threshold. If it is detected that the target proximity value is less than the preset second threshold, the calculation module 304 may determine the terminal to be in a remote state. The preset second threshold is less than the preset first threshold.

For example, if the value of the preset first threshold is 400, the calculation module 304 may determine the terminal to be in a proximity state when the calculated target proximity value is greater than 400, thereby triggering the terminal to perform operations such as turning off the backlight of the display screen. A value of the preset second threshold may be 300. Accordingly, when the calculated target proximity value is less than 300, the calculation module 304 may determine the terminal to be in a remote state, thereby triggering the terminal to perform an operation of illuminating the display screen, or the like.

In some embodiments, the detection module 302 may be configured to:

Detect whether the ambient light intensity value is greater than a preset light intensity threshold.

Determine the terminal to be in the bright light environment in response to the ambient light intensity value being greater than the preset light intensity threshold.

Determine the terminal not to be in the bright light environment in response to the ambient light intensity value being less than or equal to the preset light intensity threshold.

For example, when detecting whether the terminal is in a bright light environment according to the acquired ambient light intensity value, the detection module 302 may detect whether the acquired ambient light intensity value is greater than the preset light intensity threshold. For example, the preset light intensity threshold may be 6000 lux.

Then, when it is detected that the ambient light intensity value is greater than 6000 lux, the detection module 302 may determine the terminal to be in a bright light environment. When it is detected that the ambient light intensity value is not greater than 6000 lux, the detection module 302 may determine the terminal not to be in the bright light environment.

Embodiments of the present disclosure may provide a non-transitory storage medium. The non-transitory storage medium may have computer programs stored therein. When being executed by a computer, the computer programs may cause the computer to perform operations in the proximity detection method of the present disclosure.

In some embodiments, the non-transitory storage medium may have computer programs stored therein, when being executed by a computer, the computer programs cause the computer to perform operations of: acquiring an ambient light intensity value; in response to the ambient light intensity value being greater than a preset light intensity threshold, controlling, sequentially, a proximity sensor not to transmit a detection signal and obtain a first proximity value, to transmit the detection signal and obtain a second proximity value, to transmit the detection signal and obtain a third proximity value, and not to transmit the detection signal and obtain a fourth proximity value; and performing proximity detection according to the first, second, third and fourth proximity values.

In some embodiments, when the computer to perform operations of performing proximity detection according to the first, second, third and fourth proximity values, the computer programs may cause the computer to perform operations of: calculating a sum of the second proximity value and the third proximity value to obtain a first sum value; calculating a sum of the second proximity value and the third proximity value to obtain a first sum value; calculating a difference value between the first sum value and the second sum value, and storing one-half of the difference as a target proximity value.

In some embodiments, when the computer to perform operations of performing proximity detection according to the first, second, third and fourth proximity values, the computer programs cause the computer to perform operations of: calculating a difference between the second proximity value and the first proximity value to obtain a first difference value; calculating a difference between the third proximity value and the fourth proximity value to obtain a second difference value; and calculating an average value of the first difference value and the second difference value, and storing the average value as a target proximity value.

In some embodiments, when the computer to perform operations of performing proximity detection according to the first, second, third and fourth proximity values, the computer programs further cause the computer to perform operations of: performing a preset operation corresponding to a proximity state of the terminal in response to a target proximity value being greater than a preset first threshold, wherein the target proximity value is calculated according to the first, second, third and fourth proximity values; or performing another preset operation corresponding to a remote state in response to the target proximity value being less than a preset second threshold, wherein the preset second threshold is less than the preset first threshold.

In some embodiments, the preset operation corresponding to the proximity state of the terminal comprises turning off a backlight of a display screen of the terminal; and the preset operation corresponding to the remote state comprises illuminating the backlight of the display screen of the terminal.

In some embodiments, the computer programs may further cause the computer to perform operation of: in response to receiving an instruction carrying variations, adjusting values of the preset first threshold and the preset second threshold according to the variations.

Embodiments of the present disclosure may provide an electronic device, the electronic device may include a non-transitory memory and a processor. The processor is configured to call computer programs stored in the non-transitory memory to perform operations in the proximity detection method of the present disclosure.

In some embodiments, the processor may be configured to call computer programs stored in the non-transitory memory to acquire an ambient light intensity value; control, sequentially, a proximity sensor not to transmit a detection signal and detect a first proximity value, to transmit a detection signal and detect a second proximity value, to transmit a detection signal and detect a third proximity value, and not to transmit a detection signal and detect a fourth proximity value in response to the ambient light intensity value being greater than a preset light intensity threshold; and perform a preset operation corresponding to a proximity state of the terminal in response to a target proximity value being greater than a preset first threshold, wherein the target proximity value is calculated according to the first, second, third and fourth proximity values.

In some embodiments, the processor may be configured to: in response to the target proximity value being less than a preset second threshold, perform another preset operation corresponding to a remote state of the terminal, wherein the preset second threshold is less than the preset first threshold.

In some embodiments, the processor may be configured to: calculate a sum of the second proximity value and the third proximity value to obtain a first sum value; calculate a sum of the first proximity value and the fourth proximity value to obtain a second sum value; calculate a difference value between the first sum value and the second sum value, and determine one-half of the difference as the target proximity value.

In some embodiments, the processor may be configured to: calculate a difference between the second proximity value and the first proximity value to obtain a first difference value; calculate a difference between the third proximity value and the fourth proximity value to obtain a second difference value; calculate an average value of the first difference value and the second difference value; and determine the average value as the target proximity value.

In some embodiments, the preset operation corresponding to the proximity state of the terminal comprises turning off a backlight of a display screen of the terminal; and the preset operation corresponding to the remote state comprises illuminating the backlight of the display screen of the terminal.

In some embodiments, the processor may be configured to: adjust values of the preset first threshold and the preset second threshold according to variations in response to receiving an instruction carrying the variations.

Figure 8:
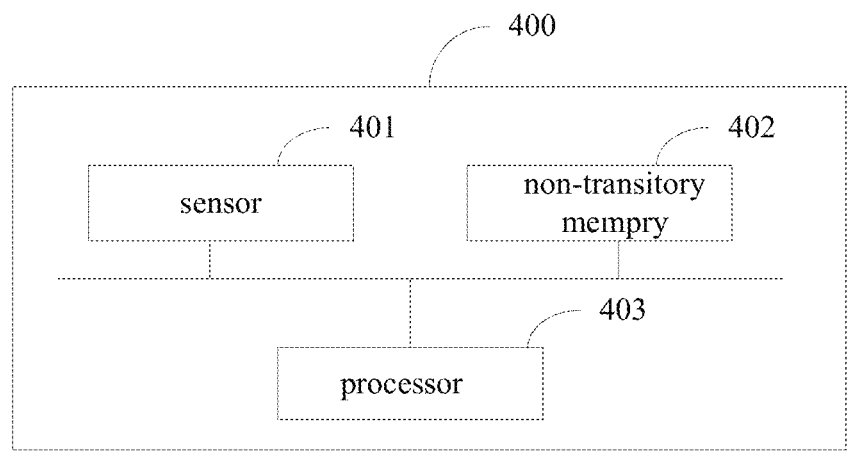
FIG. 8 is a structural diagram of a mobile terminal according to some embodiments of the present disclosure.

For example, the above electronic device may be a mobile terminal, such as a tablet computer or a smart phone. Reference is made to FIG. 8, which is a structural diagram of a mobile terminal according to an embodiment of the present disclosure.

The mobile terminal 400 may include such components as a sensor 401, a non-transitory memory 402, a processor 403, and the like. It may be understood by those skilled in the art that the mobile terminal structure shown in FIG. 8 does not constitute a limitation of the mobile terminal, and may include more or less components than those illustrated in FIG. 8, or have some components combined, or have components arranged in different manners.

The sensor 401 may include at least an ambient light sensor and a proximity sensor. The ambient light sensor may adjust brightness of the display panel according to the brightness of the ambient light. The proximity sensor may turn off the display panel and/or the backlight when the mobile terminal moves to the ear.

The non-transitory memory 402 may be configured to store applications and data. The applications stored in the memory 402 contain executable codes. The applications may form various functional modules. The processor 403 may execute various functional applications and data processing by running the applications stored in the memory 402.

The processor 403, as a control center of the mobile terminal, may be connected to various parts of the entire mobile terminal using various interfaces and lines, and execute various functions of the mobile terminal and processes data by running or executing the applications stored in the memory 402 and calling the data stored in the memory 402, thereby monitoring the mobile terminal as a whole.

In the present embodiment, the processor 403 in the mobile terminal may load executable codes corresponding to the processes of one or more applications into the memory 402 according to the following instruction, and run the applications stored in the memory 402 to perform the following operations.

The sensor 401 may acquire an ambient light intensity value.

The processor 403 may detect whether the terminal is in a bright light environment according to the ambient light intensity value.

If it is detected that the terminal is in the bright light environment, the processor 403 may read at least one group of proximity values output by a proximity sensor. Each group of proximity values may include proximity values output by the proximity sensor in response to a transmitting end of the proximity sensor being sequentially controlled not to transmit a detection signal, to transmit a detection signal, to transmit a detection signal and not to transmit a detection signal.

The processor 403 may calculate a target proximity value according to the at least one group of proximity values, and perform proximity detection according to the target proximity value.

Figure 9:
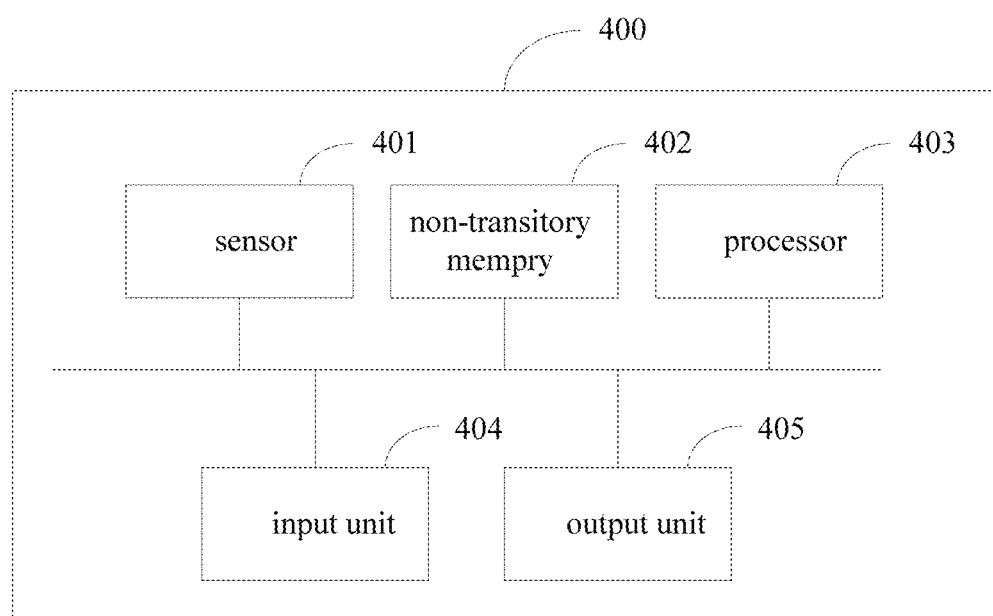
FIG. 9 is another structural diagram of a mobile terminal according to some embodiments of the present disclosure.

Furthermore, referring to FIG. 9, a mobile terminal 400 may further include an input unit 404 and an output unit 405.

The input unit 404 may be configured to receive input digits, character information, or user feature information (such as fingerprints), and to generate keyboard, mouse, joystick, optical, or trackball signal inputs related to user settings and function controlling. In some embodiments, the input unit 404 may include a touch-sensitive surface and other input means. The touch-sensitive surface is also referred to as a touch display screen or a touch control panel.

The output unit 405 may be configured to display information input by the user or information provided to the user, and various graphical user interfaces of the mobile terminal. The graphical user interfaces may be composed of graphics, texts, icons, videos, and any combination thereof. The output unit may include a display panel.

In some embodiments, when the processor 403 performs the operations of calculating a target proximity value according to the at least one group of proximity values, the processor 403 may perform the following operations: determining the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively; calculating a sum of the second proximity value and the third proximity value to obtain a first sum value; calculating a sum of the first proximity value and the fourth proximity value to obtain a second sum value; and calculating a difference value between the first sum value and the second sum value, and determine one-half of the difference as the target proximity value.

In some embodiments, when the processor 403 performs the operations of calculating a target proximity value according to the at least one group of proximity values, the processor 403 may perform the operation of determining the terminal to be in a proximity state in response to the target proximity value being greater than a preset first threshold.

In some embodiments, the processor 403 may further perform operation of determining the terminal to be in a remote state in response to the target proximity value being less than a preset second threshold. The preset second threshold is less than the preset first threshold.

In some embodiments, when the processor 403 detects whether a terminal is in a bright light environment according to the ambient light intensity value, the processor 403 may perform the following operations: detecting whether the ambient light intensity value is greater than a preset light intensity threshold; determining the terminal to be in the bright light environment in response to the ambient light intensity value being greater than the preset light intensity threshold; and determining the terminal not to be in the bright light environment in response to the ambient light intensity value being less than or equal to the preset light intensity threshold.

In the above-mentioned embodiments, the descriptions of the various embodiments have different emphases. As for portions not detailed in a certain embodiment, reference may be made to the above detailed description of the proximity detection method, and thus details are omitted herein.

The proximity detection apparatus provided by the embodiments of the present disclosure belongs to the same concept as the proximity detection method according to the embodiments of the foregoing disclosure. Specific implementation procedures of any method provided in the embodiments where the proximity detection method may be run on the proximity detection apparatus are detailed in the proximity detection method embodiments, and thus details are omitted herein.

It should be noted that, for the proximity detection method of the embodiments of the present disclosure, ordinary skilled in the related art shall understand that all or some operations of various methods as described in the above embodiments may be completed by instructing related hardware through a program. The program may be stored in a computer-readable non-transitory storage medium, such as a non-transitory memory of the electronic device, and the program may be executed by at least one processor in the electronic device. The execution may include operations of identifying the user location as described in the above embodiments. The non-transitory storage medium may include: a magnetic disc, a compact disc, a read only memory (ROM), a random access memory (RAM), or the like.

For the proximity detection apparatus of the embodiments of the present disclosure, various functional modules thereof may be integrated into a processing chip, or may be physically present as independent components. Alternatively, two or more modules may be integrated into one module. The above integrated modules may be realized as hardware or realized as functional modules of software. The integrated module, if implemented in the form of a software functional module and sold or used as an independent product, may also be stored in a computer readable storage medium, such as a read only memory, a magnetic disk or a compact disc, etc.

Proximity detection method, apparatus, storage medium and electronic device of the embodiments of the present disclosure have been described in detail above. The present disclosure has applied concrete examples to illustrate the principles and implementation modes of the present disclosure. The description of the above embodiments is merely intended to help understand the method of the present disclosure and its core ideas. Meanwhile, those ordinarily skilled in the art may make variations in specific embodiments and application ranges in light of the concept of the present disclosure. In sum, the contents set forth in the present description shall not be construed as limiting the present disclosure.

What is claimed is:

1. An electronic device, comprising: a non-transitory memory and a processor, wherein the processor is configured to call computer programs stored in the nontransitory memory to:

acquire an ambient light intensity value;

control, sequentially, a proximity sensor not to transmit a detection signal and detect a first proximity value, to transmit a detection signal and detect a second proximity value, to transmit a detection signal and detect a third proximity value, and not to transmit a detection signal and detect a fourth proximity value in response to the ambient light intensity value being greater than a preset light intensity threshold; and perform a preset operation corresponding to a proximity state of a terminal in response to a target proximity value being greater than a preset first threshold, wherein the target proximity value is calculated according to the first proximity value, the second proximity value, the third proximity value, and the fourth proximity value.

2. The electronic device according to claim 1, wherein the processor is configured to:

in response to the target proximity value being less than a preset second threshold, perform another preset operation corresponding to a remote state of the terminal, wherein the preset second threshold is less than the preset first threshold.

3. The electronic device according to claim 2, wherein the preset operation corresponding to the proximity state of the terminal comprises turning off a backlight of a display screen of the terminal; and the preset operation corresponding to the remote state comprises illuminating the backlight of the display screen of the terminal.

4. The electronic device according to claim 2, wherein the processor is configured to:

adjust values of the preset first threshold and the preset second threshold according to variations in response to receiving an instruction carrying the variations.

5. The electronic device according to claim 1, wherein the processor is configured to:

calculate a sum of the second proximity value and the third proximity value to obtain a first sum value;

calculate a sum of the first proximity value and the fourth proximity value to obtain a second sum value;

calculate a difference value between the first sum value and the second sum value; and determine one-half of the difference as the target proximity value.

6. The electronic device according to claim 1, wherein the processor is configured to:

calculate a difference between the second proximity value and the first proximity value to obtain a first difference value;

calculate a difference between the third proximity value and the fourth proximity value to obtain a second difference value;

calculate an average value of the first difference value and the second difference value; and determine the average value as the target proximity value.

7. A non-transitory storage medium, having computer programs stored therein, wherein when being executed by a computer, the computer programs cause the computer to perform operations of:

acquiring an ambient light intensity value;

in response to the ambient light intensity value being greater than a preset light intensity threshold, controlling, sequentially, a proximity sensor not to transmit a detection signal and obtain a first proximity value, to transmit the detection signal and obtain a second proximity value, to transmit the detection signal and obtain a third proximity value, and not to transmit the detection signal and obtain a fourth proximity value; and performing proximity detection according to the first proximity value, the second proximity value, the third proximity value, and the fourth proximity value.

8. The non-transitory storage medium according to claim 7, wherein when the computer to perform operations of performing proximity detection according to the first proximity value, the second proximity value, the third proximity value, and the fourth proximity value, the computer programs cause the computer to perform operations of:

calculating a sum of the second proximity value and the third proximity value to obtain a first sum value;

calculating a sum of the first proximity value and the fourth proximity value to obtain a second sum value; and calculating a difference value between the first sum value and the second sum value, and storing one-half of the difference as a target proximity value.

9. The non-transitory storage medium according to claim 7, wherein when the computer to perform operations of performing proximity detection according to the first proximity value, the second proximity value, the third proximity value, and the fourth proximity value, the computer programs cause the computer to perform operations of:

calculating a difference between the second proximity value and the first proximity value to obtain a first difference value;

calculating a difference between the third proximity value and the fourth proximity value to obtain a second difference value; and calculating an average value of the first difference value and the second difference value, and storing the average value as a target proximity value.

10. The non-transitory storage medium according to claim 7, wherein when the computer to perform operations of performing proximity detection according to the first proximity value, the second proximity value, the third proximity value, and the fourth proximity value, the computer programs further cause the computer to perform operations of:

performing a preset operation corresponding to a proximity state of a terminal in response to a target proximity value being greater than a preset first threshold, wherein the target proximity value is calculated according to the first, second, third and fourth proximity values.

11. The non-transitory storage medium according to claim 10, wherein when the computer to perform operations of performing proximity detection according to the first proximity value, the second proximity value, the third proximity value, and the fourth proximity value, the computer programs further cause the computer to perform operations of:

performing another preset operation corresponding to a remote state in response to the target proximity value being less than a preset second threshold, wherein the preset second threshold is less than the preset first threshold.

12. The non-transitory storage medium according to claim 11, wherein the preset operation corresponding to the proximity state of the terminal comprises turning off a backlight of a display screen of the terminal; and the preset operation corresponding to the remote state comprises illuminating the backlight of the display screen of the terminal.

13. The non-transitory storage medium according to claim 11, wherein the computer programs further cause the computer to perform operation of: in response to receiving an instruction carrying variations, adjusting values of the preset first threshold and the preset second threshold according to the variations.

14. A proximity detection method, comprising:

acquiring an ambient light intensity value;

detecting whether a terminal is in a bright light environment according to the ambient light intensity value;

in response to the terminal being in the bright light environment, reading at least one group of proximity values output by a proximity sensor, wherein each group of proximity values output by the proximity sensor comprises proximity values output by the proximity sensor in response to a transmitting end of the proximity sensor being sequentially controlled not to transmit a detection signal, to transmit the detection signal, to transmit the detection signal, and not to transmit the detection signal; and calculating a target proximity value according to the at least one group of proximity values output by the proximity sensor, and performing proximity detection according to the target proximity value.

15. The proximity detection method according to claim 14, wherein the calculating the target proximity value according to the at least one group of proximity values output by the proximity sensor comprises:

determining, the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively;

calculating a sum of the second proximity value and the third proximity value to obtain a first sum value;

calculating a sum of the first proximity value and the fourth proximity value to obtain a second sum value; and calculating a difference value between the first sum value and the second sum value, and determining one-half of the difference as the target proximity value.

16. The proximity detection method according to claim 14, wherein the calculating the target proximity value according to the at least one group of proximity values output by the proximity sensor comprises:

determining, the proximity values output by the proximity sensor in response to the transmitting end of the proximity sensor sequentially not transmitting a detection signal, transmitting a detection signal, transmitting a detection signal, and not transmitting a detection signal, as a first proximity value, a second proximity value, a third proximity value, and a fourth proximity value, respectively;

calculating a difference between the second proximity value and the first proximity value to obtain a first difference value;

calculating a difference between the third proximity value and the fourth proximity value to obtain a second difference value; and calculating an average value of the first difference value and the second difference value, and determining the average value as the target proximity value.

17. The proximity detection method according to claim 14, wherein the performing proximity detection according to the target proximity value comprises:

determining the terminal to be in a proximity state and triggering the terminal to perform an operation of turning off a backlight of a display screen of the terminal in response to the target proximity value being greater than a preset first threshold.

18. The proximity detection method according to claim 17, further comprises:
determining the terminal to be in a remote state and triggering the terminal to perform an operation of illuminating the backlight of the display screen of the terminal in response to the target proximity value being less than a preset second threshold, wherein the preset second threshold is less than the preset first threshold.

19. The proximity detection method according to claim 18, further comprises:
in response to receiving an instruction carrying variations, adjusting values of the preset first threshold and the preset second threshold according to the variations.

20. The proximity detection method according to claim 14, wherein the detecting whether the terminal is in the bright light environment according to the ambient light intensity value comprises:
detecting whether the ambient light intensity value is greater than a preset light intensity threshold;
determining the terminal to be in the bright light environment in response to the ambient light intensity value being greater than the preset light intensity threshold; and
determining the terminal not to be in the bright light environment in response to the ambient light intensity value being less than or equal to the preset light intensity threshold.

* * * * *